United States Patent [19]

Willi

[11] Patent Number: 4,496,014

[45] Date of Patent: Jan. 29, 1985

[54] WEIGHING APPARATUS INCLUDING OVERLOAD PROTECTION MEANS

[75] Inventor: Ernst Willi, Dürnten, Switzerland

[73] Assignee: Mottler Instrumente AB, Greifensee, Switzerland

[21] Appl. No.: 477,723

[22] Filed: Mar. 22, 1983

[30] Foreign Application Priority Data

Jul. 20, 1982 [CH] Switzerland .................. 4412/82

[51] Int. Cl.³ ........................................... G01G 21/10
[52] U.S. Cl. .................................. 177/187; 177/184; 177/189; 177/225; 177/126
[58] Field of Search ............... 177/184, 212, 126, 225, 177/154, 189, 211, 155, 156, 157, 158, 159, 134, 153, 187; 52/79.5, 29

[56] References Cited

U.S. PATENT DOCUMENTS

| 4,278,139 | 7/1981 | Caris | 177/154 |
| 4,300,646 | 10/1981 | Melcher et al. | 177/212 |
| 4,411,327 | 10/1983 | Lockery et al. | 177/211 |

FOREIGN PATENT DOCUMENTS 2933415 4/1980 Fed. Rep. of Germany ...... 177/189
2905314 8/1980 Fed. Rep. of Germany ...... 177/211

*Primary Examiner*—E. A. Goldberg
*Assistant Examiner*—Fred L. Kampe
*Attorney, Agent, or Firm*—Laubscher, Philpitt & Laubscher

[57] ABSTRACT

Weighing apparatus is disclosed of the short-stroke vibratory string type including a housing (3, 5) in which is arranged a load cell device including a stationary member (1) and a vertically movable load receiving member (2), characterized by the provision of a vertically collapsible overload protection device (F) arranged within the housing around the stationary load cell member for connecting a weighing platform or pan (6) arranged above the housing with the movable load receiver member. The overload protection device includes a horizontal open rectangular frame having relatively vertically movable upper (7) and lower (8) frame sections, stop lugs (23) being provided on the housing for limiting the extent of downward travel of the upper frame member. A snap spring arrangement (14, 18) is provided for biasing the upper and lower frame members vertically apart.

7 Claims, 2 Drawing Figures

WEIGHING APPARATUS INCLUDING OVERLOAD PROTECTION MEANS

BRIEF DESCRIPTION OF THE PRIOR ART

Weighing apparatus of the short-stroke type (i.e. of the vibratory string type) are well known in the art, as evidenced, for example, by the U.S. Pat. Nos. 3,779,072, 3,788,134, 3,897,681 and 3,963,082, to Meier among others.

In such devices, it is desirable to provide overload protection means for protecting the components against damage when a load is placed on the weighing pan or platform that exceed the nominal range of the apparatus. Thus, it has been proposed to provide fixed stop means for limiting the downward extent of travel of a first component connected with the weighing pan, and snap spring means arranged between this first component and a lower second component that is connected with the load receiving member of the load cell.

In German Offenlegungsschrift No. 29 33 415, weighing apparatus of this type is disclosed wherein the mentioned protective device is arranged outside the scale housing directly below the scale pan or forms a part of same. This arrangement has the disadvantage of requiring the scale to have a greater structural height.

In scales with a greater nominal load having, in general, a relatively large rectangular weighing platform, the platform rests on several supports which penetrate the scale housing and these supports transmit the load to the load receiver of the weighing cell. These supports stand on a rigid load reception frame which surrounds the weighing cell and which is attached to the load receiving member of the weighing cell.

SUMMARY OF THE INVENTION

A primary object of the present invention is to provide an improved weighing apparatus of the shortstroke type including overload protection means arranged horizontally within the housing concentrically about the stationary member of the load cell means. In this manner, on the one hand, the structural height of the scale is reduced and, on the other hand, the overall construction of the scale is simplified with an attendant appreciable savings in material and manufacturing cost.

The basic idea behind the present invention is to shift the protective device from the scale dish into the previously-mentioned load receiver frame or to make this frame as the protective device.

To this end, the invention resides in the fact that the overload protective device is formed as an open rectangular frame structure that is arranged within the scale housing concentrically around the weighing cell, the frame means being attached directly to the load receiver of the weighing cell.

The snap spring arrangement may be formed, for example, according to FIGS. 1 and 2 of the aforementioned German Offenlegungsschrift No. 29 33 415, and includes parallel guidance arms arranged diagonally at an angle of about 45° relative to the horizontal, and by means of generally horizontally arranged springs biasing the upper and lower parts.

In accordance with a more specific object of the invention, the point of engagement of the spring means on the lower part of the protective device is at a higher elevation than its point of engagement on the upper part so that a vertical component of the spring force, directed upwardly, will always act on the upper frame part. In this way, the force which is exerted by the snap spring arrangement upon the upper part and which counteracts the load forms a rather flat, steadily decreasing curve over the entire length of the operating stroke. This means that the triggering force, at which the snap spring arrangement is collapsed, must be slightly greater than the return force up to which the scale must be relieved so that the protective device will by itself return to the normal position. Although the return force should be somewhat greater than the nominal load of the scale, a value for the triggering force is achieved that is only slightly higher when compared to the nominal load, which means that the level of the overload to be absorbed by the weighing cell can be kept small. Furthermore, the flat force curve of the snap spring arrangement makes it possible to select a relatively long switching stroke for the upper part of the protective device so that special adjusting means for the elevation position of the stop can be omitted.

BRIEF DESCRIPTION OF THE DRAWING

Other objects and advantages of the invention will become apparent from a study of the following specification when viewed in the light of the accompanying drawing, in which.

DETAILED DESCRIPTION

Figure 1:
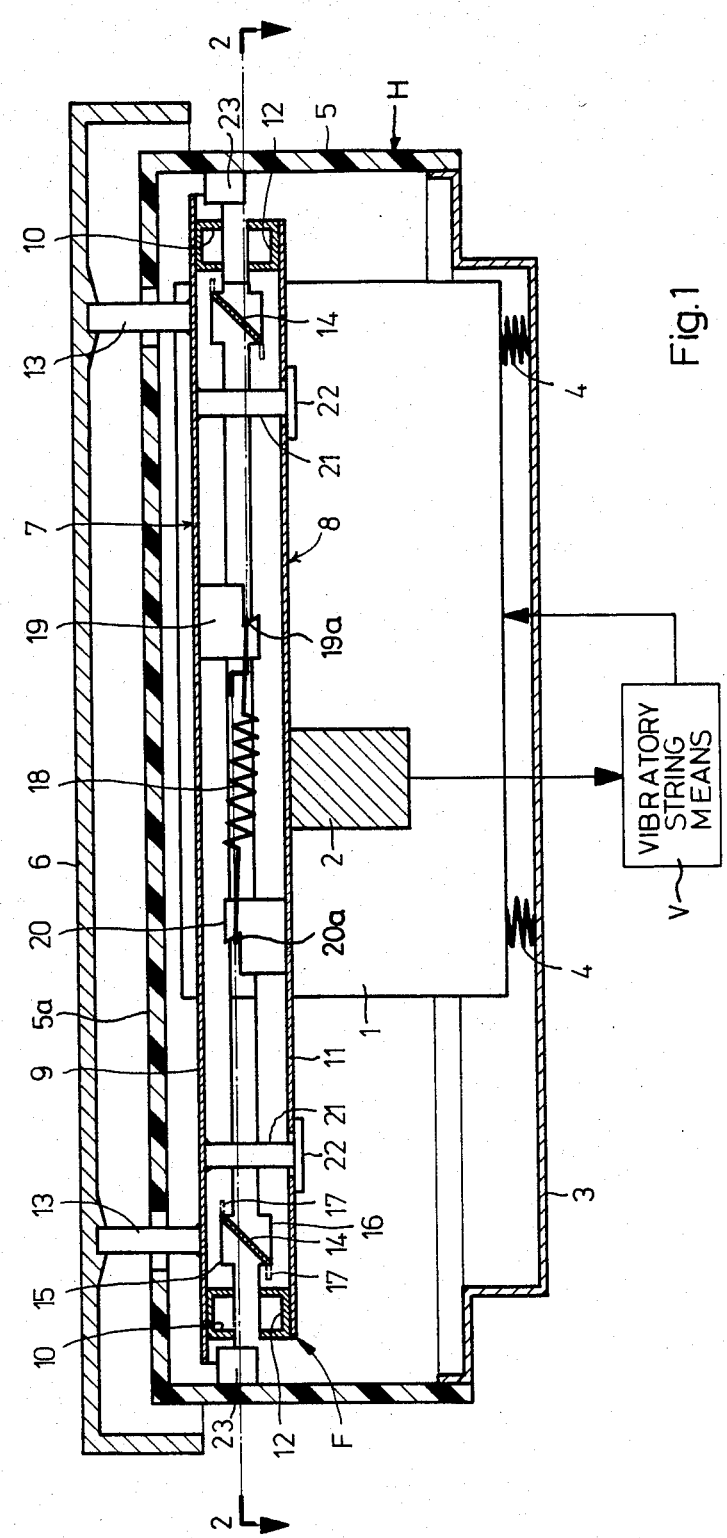
FIG. 1 is a longitudinal sectional view of the weighing apparatus of the present invention, with certain parts removed for clarity.
Figure 2:
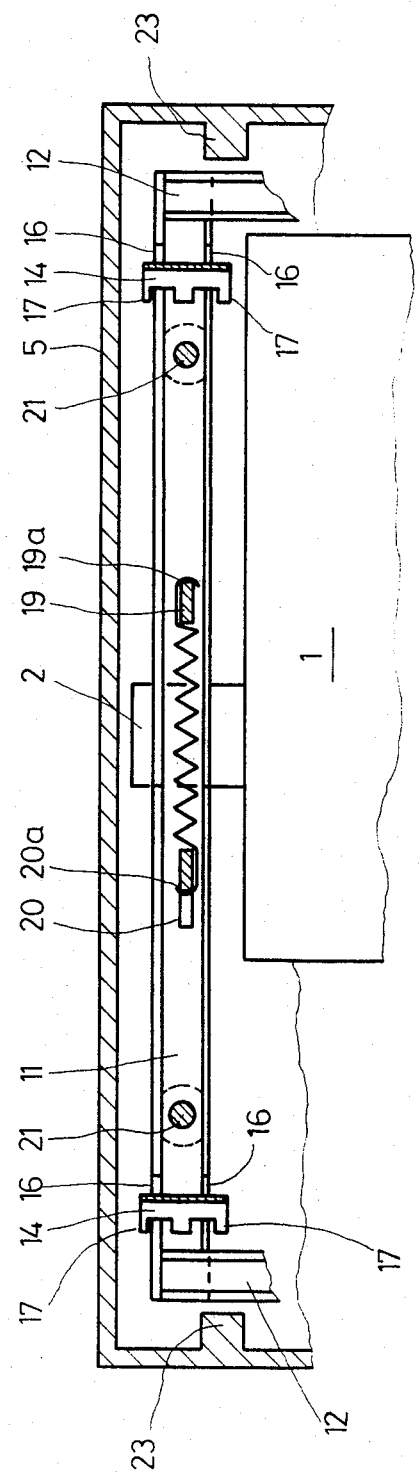
FIG. 2 is a sectional view taken along line 2—2 of FIG. 1.

Referring now more particularly to the drawings, the weighing apparatus includes a housing H having a sheet metal base 3 and a synthetic plastic upper portion 5, which housing includes a chamber for receiving conventional short-stroke load cell means (of the type including vibratory measuring string means V, for example). The stationary part 1 of the load cell means is supported above the base 3 by a plurality of shock-absorbing springs 4, the vertically movable load receiving member 2 extending horizontally from opposite sides of the stationary member 1. The weighing pan or platform 6 extends horizontally above the horizontal upper wall portion 5a of the housing.

In accordance with a characterizing feature of the present invention, overload protection means are arranged in the housing for transmitting the movement of weighing pan 6 to the load receiving member 2. The overload protection means includes horizontal rectangular open frame means F arranged in spaced relation around the stationary load cell 1, said frame means including relatively vertically displaceable upper and lower welded frame members 7 and 8, respectively. The upper frame member 7 includes a pair of spaced longitudinal U-shaped members 9 connected by a pair of spaced transverse U-shaped members 10, and the lower frame member 8 includes a pair of spaced U-shaped longitudinal for members 11 connected by a pair of spaced transverse U-shaped bar members 12. Vertical spacer bolts 13 extending through corresponding openings contained in upper housing wall 5a connect the upper frame member 7 with the weighing pan or platform 6. The lower frame member 8 rests on and is rigidly connected with the load receiver member 2.

In accordance with a specific feature of the invention, means including parallel guidance means are provided for biasing the frame sections 7 and 8 vertically apart. More particularly, a pair of parallel guide arms 14 arranged at an angle of about 45° to the horizontal are mounted between opposed grooves 15 and 16 contained in the flange portions of the U-shaped frame bar members 9 and 11, respectively. The guide arms are formed of sheet metal and include at their upper and lower ends lateral stabilizing tabs 17 that extend on opposite sides of the flange portions of the frames. On each side of the frame means, a horizontal longitudinally-extending tension spring 18 is provided between the frame sections 7 and 8, the spring being connected between projections 19 and 20 that extend downwardly and upwardly from the upper and lower frame sections 7 and 8, respectively. The point of connection 20a of the spring 18 with the lower projection 20 is at a higher elevation than the point of connection 19a of the spring with the upper projection 19, whereby the spring force acting on the upper frame 7 will always have an upwardly directed component.

The guide arms 14, together with springs 18, form a snap spring arrangement which, when the scale is loaded within the nominal load range, maintains the two frames 7 and 8 at a certain spacing distance from each other. This spacing distance is determined by the length of the bolts 21 which are attached to the longitudinal bar 9 of the upper frame member 7 and which extend through the longitudinal bar 11 of the lower frame 8 and which grasp under it with a head 22. Corresponding bolts are also provided on the other longitudinal side of frames 7 and 8.

In case of a static or dynamic overload of the scale, the snap spring arrangement will suddenly collapse, whereby the upper frame 7 will move down toward the lower frame 8. The downward movement of the upper frame 7 is limited by fixed stop means defined by lugs 23 on the upper part 5 of the scale housing and which cooperate with the ends of the longitudinal bar 9. In determining the vertical elevation of the lugs 23, the spring path of the shock absorber springs 4 on the underside of weighing cell 1 must also be taken into consideration.

Once the overload has been removed from scale pan 6, spring 18 biases guide arms 14 toward their illustrated position to separate the frames 7 and 8 to the extent permitted by connecting bolts 21.

While the preferred forms and embodiments have been illustrated and described, various changes and modifications may be made without deviating from the inventive concepts set forth above.

What is claimed is:
1. Weighing apparatus, comprising
(a) a hollow housing (3,5) containing a chamber;
(b) load cell means mounted within said housing chamber and including a stationary member (1) and a vertically movable load receiving member (2);
(c) a weighing pan (6) arranged above said housing; and
(d) means including overload protection means connecting said weighing pan with said load receiving member, said connecting means including
  (1) upper and lower open generally-rectangular vertically spaced frame members (7,8) mounted horizontally within said chamber concentrically about said stationary load cell member;
  (2) means connecting said upper and lower frame members with said weighing pan and with said load receiving member, respectively; and
  (3) snap spring means (14,18) normally biasing said upper frame member upwardly relative to said lower frame member to establish an operating condition in which a force applied to said weighing pan is transmitted to said load receiving member via said upper frame member, said snap spring means, and said lower frame member, said snap spring means being operable, when an overload force is applied to said weighing pan that exceeds the biasing force of said snap spring means, to relax said frame members and thereby isolate said load receiving member from said weighing pan.

2. Apparatus as defined in claim 1, wherein said snap spring means comprises
  (1) parallel guidance means including a plurality of parallel guide arms connected for pivotal movement about parallel horizontal pivot axes between said upper and lower frame members and normally having an angle of about 45° relative to the horizontal; and
  (2) a plurality of generally horizontal parallel tension springs (18) connected between said upper and lower frame members and arranged generally normal to the pivot axes of said guide arms, the point of connection (20a) of said spring means with said lower frame member being at a higher elevation than the point of connection of said spring means with said upper frame member.

3. Apparatus as defined in claim 1, wherein said housing includes fixed stop lugs (23) limiting the downward extent of travel of said upper frame member.

4. Apparatus as defined in claim 3, wherein said upper frame member is connected with said weighing pan by vertical spacer bolts (13) that extend through vertical openings contained in the upper wall of said housing.

5. Apparatus as defined in claim 4, and further including vertical guide bolt means (21) connecting said upper and lower frame members for limited vertical movement relative to each other.

6. Apparatus as defined in claim 2, wherein each of said guide arms comprises a rigid guide plate supported at opposite longitudinal edges for pivotal movement relative to the associated frame member, respectively.

7. Apparatus as defined in claim 6, wherein said upper and lower frame members include downwardly and upwardly extending projections (19, 20) each having hook-like portions (19a, 20a) adapted for connection with the opposite ends of a spring, respectively.

* * * * *

UNITED STATES PATENT AND TRADEMARK OFFICE
CERTIFICATE OF CORRECTION

PATENT NO. : 4,496,014

DATED : January 29, 1985

INVENTOR(S) : Ernst Willi

It is certified that error appears in the above—identified patent and that said Letters Patent is hereby corrected as shown below:

Item [73]:

In the Heading, correct the name of the assignee to read:

-- Mettler Instrumente AG --

Signed and Sealed this

Fourteenth Day of May 1985

[SEAL]

Attest:

DONALD J. QUIGG

*Attesting Officer*     *Acting Commissioner of Patents and Trademarks*